United States Patent [19]
Pagdin

[11] 3,863,615
[45] Feb. 4, 1975

[54] METHOD OF AND SYSTEM FOR CONTROLLING AIR TO FUEL RATIO FOR AN INTERNAL COMBUSTION ENGINE

[75] Inventor: Brian Colin Pagdin, Sutton Coldfield, England

[73] Assignee: GKN Transmissions Limited, Erdington, Birmingham, England

[22] Filed: Feb. 6, 1974

[21] Appl. No.: 440,265

[30] Foreign Application Priority Data
Feb. 6, 1973 Great Britain ...................... 5761/73

[52] U.S. Cl. ................................ 123/119 A, 123/3
[51] Int. Cl. .......................................... F02m 25/06
[58] Field of Search ............... 123/119 A, 3; 60/278

[56] References Cited
UNITED STATES PATENTS

| | | | |
|---|---|---|---|
| 1,916,325 | 7/1933 | McAdams | 123/119 A |
| 2,889,904 | 6/1959 | Martinoli | 123/119 A |
| 3,019,780 | 2/1962 | Nuding | 123/119 A |
| 3,476,524 | 11/1969 | Burke | 60/278 |

*Primary Examiner*—Wendell E. Burns
*Assistant Examiner*—D. D. Reynolds
*Attorney, Agent, or Firm*—Spencer & Kaye

[57] ABSTRACT

A system for supplementing the control of air to fuel ratio provided by a fuel injection apparatus or carburettor of an internal combustion engine comprising a combustion chamber having an inlet connected to the exhaust pipe of the engine and an outlet connected to the air intake downstream of a throttle valve therein, such combustion chamber containing an electrically heated filament on which carbon monoxide or other selected combustible constituent of exhaust drawn through the combustion chamber is burnt, temperature responsive valve means associated with the combustion chamber providing variable constriction to the outflow of the products of combustion therefrom to the air inlet to increase such constriction with increase in the heat of combustion.

10 Claims, 3 Drawing Figures

METHOD OF AND SYSTEM FOR CONTROLLING AIR TO FUEL RATIO FOR AN INTERNAL COMBUSTION ENGINE

BACKGROUND OF THE INVENTION

This invention relates to a method of and system, that is apparatus, for controlling the ratio of air to fuel admitted to an internal combustion engine.

While the method and system have been developed for application to an internal combustion engine for which the air supply and fuel is provided by way of a fuel injection apparatus, the invention is capable also of application where the air supply and fuel is provided by way of a carburettor.

Fuel injection apparatus and carburettors both include means for controlling the ratio of air to fuel supplied to the engine and operative to maintain this ratio at a proper value for a range of engine loads and for a range of external conditions of operation.

The control over this ratio provided by fuel injection apparatus, as currently in use, although more accurate over the range of loads and conditions of operation than that achieved by carburettors, is not, however, sufficiently accurate to avoid atmospheric pollution by virtue of certain constituents in the exhaust from the engine. The main polluting constituents are carbon monoxide, unburnt hydrocarbons and oxides of nitrogen.

The present approach to reduction of atmospheric pollution is to provide a reactor means for absorbing the polluting constituents. For this purpose one form of reactor means, usually termed a single bed reactor, has comprised platinum supported upon a ceramic matrix of a form to admit of the passage therethrough of the engine exhaust and to provide extensive contact between the surface of the platinum and the exhaust, the platinum acting as a catalyst producing oxidation (burning) of carbon monoxide and residual hydrocarbons in the exhaust.

When the exhaust contains carbon monoxide outside a certain range, i.e., about 0.4 percent to 1.0 percent, such a single bed reactor means can no longer treat the exhaust effectively, and in order to remove oxides of nitrogen a more complex and more expensive reactor means is required in which reaction takes place in two stages. The first reactor unit or bed includes substances selected to effect reduction of the oxides of nitrogen, and the second reactor unit or bed is generally similar to that of the single bed reactor means already mentioned.

If a single bed reactor means is to be employed, it is necessary that the ratio of air to fuel admitted to the internal combustion engine shall be controlled more accurately than has hitherto been the practice with either fuel injection apparatus or carburettors so that the single bed reactor means can reduce the proportion of polluting constituents to acceptable limits. For practical purposes the level of unburnt carbon monoxide, before treatment, should not exceed 1 percent. By "acceptable limits" is meant the limits prescribed by the competent authority in the U.K. or elsewhere in the area in which the apparatus is to be used. For the purposes of the present application an acceptable limit for carbon monoxide is to be deemed at the present time to be 3.4 gm/mil measured by a constant volume sampling procedure.

For maximum fuel economy the ratio of air to fuel should be maintained at stoichiometric proportions (this latter being the ratio at which all the fuel is burnt and no excess oxygen is present in the exhaust).

Depending upon the constituents in the fuel stoichiometric proportions vary between about 14 : 1 to 16 : 1.

Adherence to a level of pollution below the acceptable limit involving operation on the rich side of stoichiometric proportions (but normally less than 5 percent rich) requires an accuracy of control of the air to fuel ratio of $\pm 0.25$ in the numerator (alternatively expressable as about $\pm 2$ percent by weight of fuel present).

Existing fuel injection apparatus, and more especially carburettors, do not achieve control of this degree of accuracy.

The object of the present invention is to improve the accuracy of control.

SUMMARY OF THE INVENTION

From one aspect the invention resides in the provision of a system for supplementing the control of air to fuel ratio provided by a fuel supply apparatus of an internal combustion engine, such system comprising means for withdrawing a fraction of the exhaust of the engine from an outflow path for such exhaust, means for burning a combustible constituent of said withdrawn fraction of exhaust, means for feeding the products of such combustion to an intake of the engine, means for controlling the ratio of said products of combustion fed to said intake to air drawn into said intake as a function of the heat produced by said combustion.

In practice the combustible constituent likely to be present in the exhaust of a properly operating engine (firing on all cylinders) and which is most damaging from the point of view of pollution, both by reason of its character and the quantity present, is carbon monoxide. This will normally be the controlling constituent so far as the production of heat is concerned giving rise to the control signal. However, it may occur (exceptionally) that some other constituent is temporarily more damaging by virtue of the quantity present (e.g. unburnt hydro-carbon due to "missing" or misfiring on one or more cylinders of the engine).

Assuming the existence of an over rich mixture which will lead to the exhaust containing too high a percentage of combustible constituents, the effect of withdrawing a fraction of this exhaust, burning the combustible constituents and feeding back the resultant products of combustion to the engine by way of the air intake, and then reducing the fraction which is withdrawn and fed back as the heat produced by said combustion increases, is to cause the effective air to fuel ratio to become leaner. This effect occurs because the products of combustion fed back to the engine are deficient in oxygen and, therefore, the higher the ratio of products of combustion to air the richer will the mixture be, and the lower the ratio of products of combustion to air the leaner will the mixture be.

From a further aspect the invention resides in a method of supplementing the control of air to fuel ratio provided by a fuel supply apparatus of an internal combustion engine, such method comprising the steps of withdrawing a fraction of the engine exhaust from an outflow path thereof, subjecting at least one combustible constituent of said withdrawn fraction of exhaust to burning, feeding the products of such combustion back to the engine intake, controlling the ratio of said feedback products of combustion to intake air fed to the engine as a function of the heat produced by said combustion.

BRIEF DESCRIPTION OF THE DRAWINGS

The invention will now be described, by way of example, with reference to the accompanying drawings wherein.

DESCRIPTION OF THE PREFERRED EMBODIMENT

Figure 1:
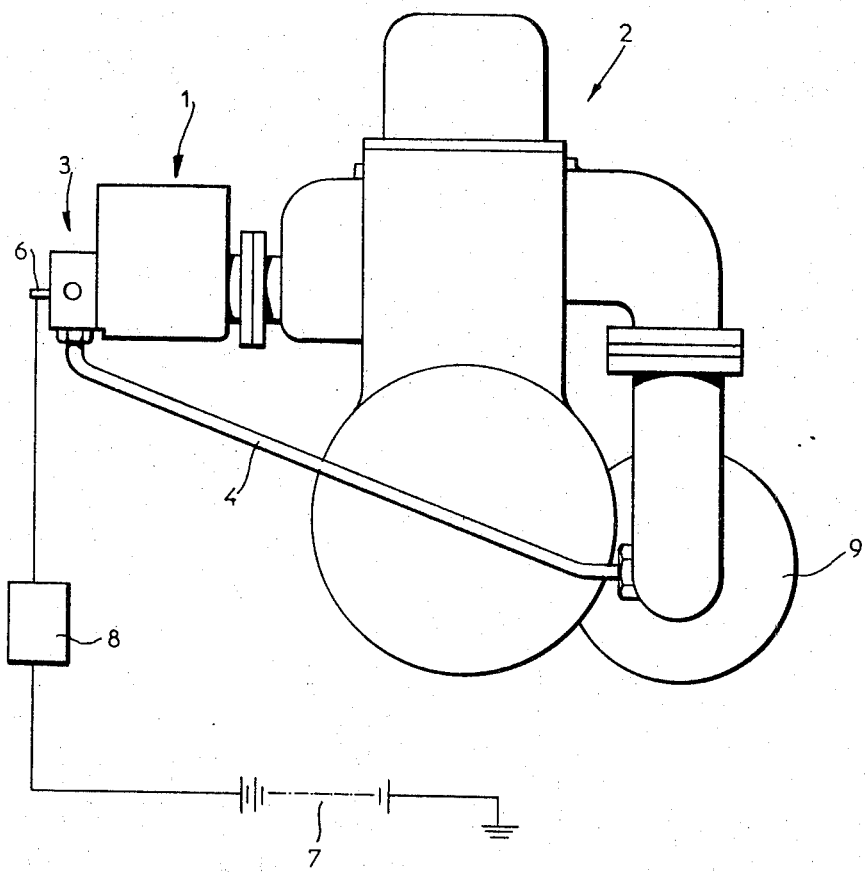
FIG. 1 is a view in end elevation of an internal combustion engine to which one embodiment of a system in accordance with the invention is applied.

The invention is illustrated in FIG. 1 as applied to a device 1 for supplying air and fuel to an engine 2. Such device 1 may be either a fuel injection apparatus or a carburettor. In the former case the device 1 may comprise a body affording an air inlet duct, a fuel pump means for establishing flow of fuel to an outlet means on the pump body, the latter being connected to one or more fuel injectors, metering means operative between the pump means and outlet means, and adapted to be driven in timed relation with the crankshaft or other rotary output member of the engine for delivering a measured quantity of fuel to the outlet means in each cycle of operation of the engine, and sensing means controlling operation of the metering means and sensing parameters which are selected to provide a proper air to fuel ratio for a range of engine loads and a range of external conditions of operation.

In the former case the carburettor may comprise a fuel and jet system supplied with fuel from a float chamber at a rate controlled by metering means operative by air pressure differentially in an air intake passageway or ducts connected thereto.

In both cases the air inlet duct of such fuel injection apparatus or carburettor will ordinarily include a manually operable throttle valve (the expression "manual" being deemed to include operation by a foot pedal), such valve being conveniently of the butterfly type.

The unit 3 now described and illustrated is intended to replace that section of the air inlet duct which incorporates the throttle valve. Broadly, the unit 3 serves, by virtue of connection via a pipe 4 to the exhaust pipe 5 of the engine, to establish withdrawal of a fraction of the exhaust gases to a combustion chamber in unit 3. A combustible constituent, e.g. carbon monoxide, is burnt in the chamber by means of an electrically heated ignition device 6. The heat generated is used to control the proportion of fresh intake air and products of combustion taken into the engine through the device 1. Current to the glow plug is derived from a battery 7 controlled by a switch unit 8.

Figure 2:
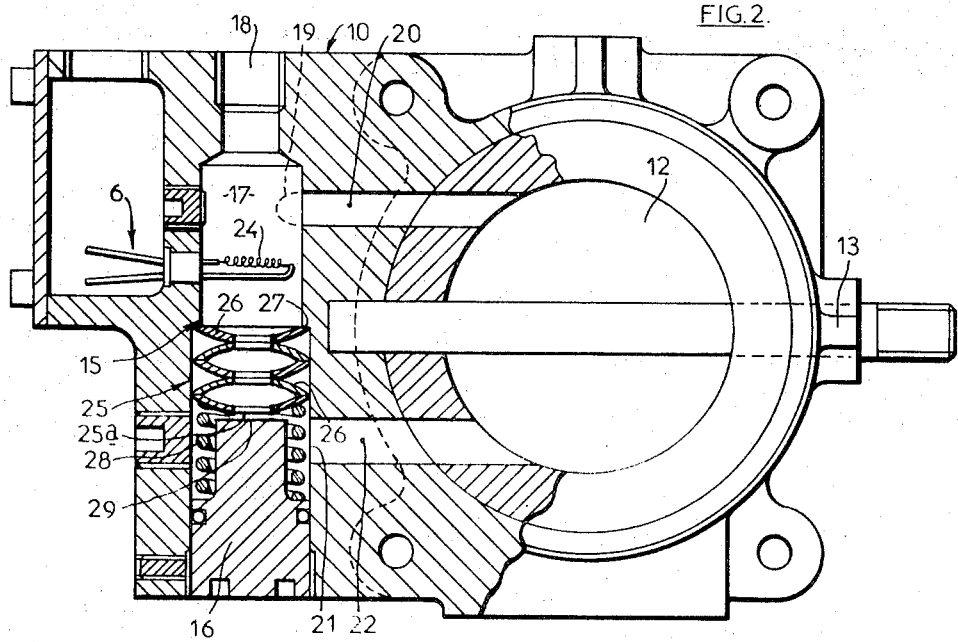
FIG. 2 is a view in elevation and partly in vertical cross-section through one embodiment of a unit incorporating a combustion chamber, ignition means and flow control means forming part of the system in accordance with the present invention for carrying out the method thereof.
Figure 3:
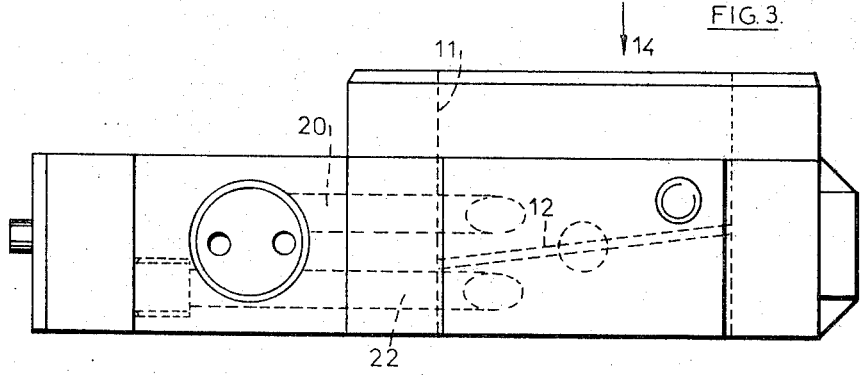
FIG. 3 is a plan view of the parts shown in FIG. 2.

Referring specifically to the unit 3 shown in FIGS. 2 and 3, this comprises a body 10 of block or plate-like form including a through passageway or duct 11 in which is mounted a butterfly plate 12 supported on a spindle 13 rotatable to move the butterfly plate forming the throttle valve between the closed position illustrated and an open position in which air is allowed to pass through the duct section 11 in the direction of the arrow 14 before entering the air intake of the fuel injection apparatus or carburettor as the case may be.

The body is also formed at one side of the duct 11 with a through bore 15, the lower end of which, as seen in FIG. 2, is screw-threaded and closed by an adjustable externally screw-threaded plug 16, and the upper portion 17 of which constitutes a combustion chamber.

The combustion chamber communicates with an inlet section 18 of the bore screw-threaded internally or otherwise adapted to receive a pipe fitting for connection to the exhaust pipe of the associated internal combustion engine to allow a fraction of the engine exhaust to enter the combustion chamber 17.

The latter also has an air inlet 19 communicating by way of a passageway 20 with the duct 11 at a position upstream of the butterfly plate 12.

The combustion chamber has an outlet 21 communicating by way of a passageway 22 with the duct 11 at the downstream side of the butterfly plate 12 where the pressure during operation of the engine is below atmospheric. This produces a pressure reduction in the combustion chamber 17 and causes the required fraction of exhaust to be withdrawn from the main flow path through the engine exhaust pipe.

In the combustion chamber 17 is provided an ignition device 6 in the form of a flow plug. This may include an electrically heated filament 24 through which current is passed to maintain the filament at a temperature such that combustion of carbon monoxide and unburnt hydro-carbons in the withdrawn fraction of exhaust takes place on or in the locality of this filament.

The rate of flow through the combustion chamber and the passageway 22 is determined by an adjustable valve means 25 which increases or decreases the restriction to flow according to the temperature attained in the combustion chamber as a result of burning therein of the combustible constituent of the withdrawn fraction of the exhaust pipe.

A simple and effective form of this valve may comprise a stack of plate elements such as washers, each washer, such as 26, being of part-spherical or domed form, having central aperture, and of bi-metallic construction such that the severity of the curvature increases as the temperature rises.

This stack of washers is arranged between a shoulder 27 in the bore and a coiled compression spring 28 which urges the stack of washers upwardly as seen in FIG. 1, the lower end of the spring bearing on the adjustable plug 16.

The control orifice 25a is defined between the lowest washer 26 and the upper surface 29 of the plug 16.

In operation the rate of flow of products of combustion from the chamber 17 through the passageway 22 to join the intake air in the duct 11 is dependent upon the constriction afforded by the control orifice between the lowermost washer 26 and the surface 29 which is in turn dependent upon the heat produced in the combustion chamber. As the temperature of the washers increases, the degree of constriction increases and thus the ratio of the products of combustion flowing through the passageway 22 to the air flowing passed the butterfly plate 12 in any given position will decrease and thereby produce weakening of the mixture (since the proportion of oxygen will increase).

It is contemplated that the fraction of exhaust withdrawn from the main flow path may be in the range 5 percent to 15 percent, 10 percent being a typical value.

Since the thermal capacity of the stack of washers 26 is low, the system responds very rapidly to changes in the rate of heat generation in the combustion chamber produced by ignition of the combustible constituents of the withdrawn fraction.

The combination of the supplementary control system now described with either a fuel injection apparatus or a carburettor may be set to reduce the unburnt combustible constituents in the exhaust to a low level (represented by 0.5 percent to 1 percent of the constituent carbon monoxide) and a corresponding low level of unburnt hydro-carbon.

This enables the exhaust to be effectively treated in a single bed reactor means comprising a ceramic matrix supporting a catalyst such as platinum in which the residual combustible constituents of the exhaust are further oxidised (burnt) so that the percentage present is decreased by a factor of as much as 10 : 1.

Further, by keeping the combustible constituents carbon monoxide and hydro-carbons to this low level through the use of the supplementary control method and system a single bed reactor means of the kind referred to connected to the exhaust pipe 5 is capable of removing other polluting constituents, namely oxides of nitrogen which otherwise would require the use of a more complex reactor means involving two reactor beds or units, the first of which would have the function of reducing the oxides of nitrogen, and the second of which would be as above described for a single bed reactor means.

It will be understood that the invention above described is intended for use in conjunction with an engine having one or more cylinders equipped with ignition means for igniting the air to fuel mixture in the cylinder or cylinders by means of spark discharge, the fuel being a volatile fuel such as petrol suitable for such ignition.

I claim:

1. A system for supplementing the control of air to fuel ratio provided by a fuel supply apparatus of an internal combustion engine, such system comprising:
   a. means for withdrawing a fraction of the exhaust of the engine from an outflow path for such exhaust,
   b. means for burning a combustible constituent of said withdrawn fraction of exhaust,
   c. means for feeding the products of such combustion to an intake of the engine,
   d. means for controlling the ratio of said products of combustion fed to said intake to air drawn into said intake as a function of the heat produced by said combustion.

2. A system according to claim 1 wherein:
   a. said means for burning a combustible constituent comprises
      i. a combustion chamber having an inlet and an outlet,
      ii. ignition means operative to effect combustion of said combustible constituent in said chamber,
      iii. means for connecting said inlet of said combustion chamber to an exhaust duct of said engine,
      iv. means for connecting said outlet of said combustion chamber to an air inlet of said engine to provide a pressure differential causing a fraction of the engine exhaust to be withdrawn from said exhaust duct into said chamber,
   b. flow control means adjustable to decrease or increase the rate of flow of products of said combustion in said combustion chamber fed from said outlet of said combustion chamber through said connecting means to said air inlet as the heat produced by said combustion increases or decreases respectively.

3. A system according to claim 2 wherein said flow control means comprises:
   a. adjustable valve means,
   b. actuating means therefor responsive to the heat produced by said combustion in said combustion chamber to set said valve means in a position providing greater or lesser constriction to flow of said products of combustion in said combustion chamber from said outlet through said connecting means to said air inlet as the heat produced by said combustion increases or decreases respectively.

4. A unit for use in combination with a fuel injection apparatus or carburettor for supplementing the control of air to fuel ratio provided thereby, such unit comprising:
   a. a body affording an air inlet duct extending therethrough to admit combustion air to the engine, and affording a combustion chamber having an inlet for connection to the exhaust outlet of the engine and an outlet connected to said inlet duct whereby a fraction of the exhaust gas is drawn through the combustion chamber,
   b. an ignition device for burning a combustible constituent of the exhaust gas in the combustion chamber, and
   c. a temperature responsive flow control device arranged to increase the constriction to exhaust flow through the combustion chamber back to said air inlet duct with rise of temperature in the combustion chamber.

5. A unit according to claim 4 wherein:
   a. a manually adjustable throttle valve is mounted in association with said air inlet duct to control the flow of air therethrough,
   b. said outlet of said combustion chamber communicates with said air inlet duct at a position downstream of said throttle valve.

6. A unit according to claim 5 wherein said combustion chamber has an additional inlet for admission of air.

7. A unit according to claim 5 wherein said flow control means comprises a stack of bi-metallic plate elements of part-spherical or domed form expansible and contractible depthwise of said stack in response to temperature changes in said combustion chamber and controlling the size of an orifice constricting flow of exhaust through said combustion chamber to said air inlet duct.

8. A method of supplementing the control of air to fuel ratio provided by a fuel supply apparatus of an internal combustion engine, such method comprising the steps of:
   a. withdrawing a fraction of the engine exhaust from an outflow path thereof,
   b. subjecting at least one combustible constituent of said withdrawn fraction of exhaust to burning,
   c. feeding the products of such combustion back to the engine intake, d. controlling the ratio of said fed back products of combustion to intake air fed to the engine as a function of the heat produced by said combustion.

9. The method according to claim 8 wherein the combustible constituent comprises carbon monoxide.

10. The method according to claim 8 wherein control of the ratio of said products of combustion to intake air is effected by controlling the fraction of the engine exhaust withdrawn from said outflow path as a function of heat produced by said combustion.

* * * * *